United States Patent
Jallouli et al.

(10) Patent No.: US 12,461,389 B2
(45) Date of Patent: Nov. 4, 2025

(54) PRIMER FOR OPHTHALMIC LENSES

(71) Applicant: ESSILOR INTERNATIONAL, Charenton-le-Pont (FR)

(72) Inventors: Aref Jallouli, Dallas, TX (US); Hao-Wen Chiu, Dallas, TX (US); Pierre Fromentin, Charenton-le-Pont (FR); Ronald A. Berzon, Dallas, TX (US); Robert Alan Valeri, Dallas, TX (US)

(73) Assignee: Essilor International, Charenton-le-Pont (FR)

( * ) Notice: Subject to any disclaimer, the term of this patent is extended or adjusted under 35 U.S.C. 154(b) by 230 days.

(21) Appl. No.: 17/317,070

(22) Filed: May 11, 2021

(65) Prior Publication Data

US 2021/0356769 A1 Nov. 18, 2021

(30) Foreign Application Priority Data

May 13, 2020 (EP) .................................... 20305489

(51) Int. Cl.
  *G02C 7/10* (2006.01)
  *G02C 7/02* (2006.01)
  *G02C 7/12* (2006.01)

(52) U.S. Cl.
  CPC ............. *G02C 7/102* (2013.01); *G02C 7/024* (2013.01); *G02C 7/12* (2013.01)

(58) Field of Classification Search
  CPC .... G02B 1/041; G02B 1/14; B29D 11/00644; B29D 11/0073; B29D 11/00634;

(Continued)

(56) References Cited

U.S. PATENT DOCUMENTS

| 6,100,313 A * | 8/2000 | Treadway | .............. C08G 59/32 |
|---|---|---|---|
| | | | 522/170 |
| 2004/0125337 A1* | 7/2004 | Boulineau | ................ G02C 7/12 |
| | | | 351/159.62 |

(Continued)

FOREIGN PATENT DOCUMENTS

| EP | 3 437 845 | 2/2019 | |
|---|---|---|---|
| EP | 3437845 A1 * | 2/2019 | ....... B29C 45/14811 |

(Continued)

OTHER PUBLICATIONS

Machine translation of JP-2016193605-A (Year: 2016).*

(Continued)

*Primary Examiner* — Pinping Sun
*Assistant Examiner* — Matthew Y Lee
(74) *Attorney, Agent, or Firm* — NIXON & VANDERHYE

(57) ABSTRACT

An ophthalmic lens including a substrate-independent adhesive primer for joining a functional element to a lens substrate. In particular, the ophthalmic lens includes at least one polymerized lens substrate including at least one thermoset monomer, a functional component including at least one thermoplastic layer, a surface of the at least one thermoplastic layer facing the polymerized lens substrate, and a primer coating deposited onto the surface of the at least one thermoplastic film facing the polymerized lens substrate.

14 Claims, 12 Drawing Sheets

(58) Field of Classification Search
CPC .............. B29D 11/00009; B32B 23/08; B32B 2255/10; B32B 2255/26; B32B 2307/42; C09D 133/14; G02C 7/12
See application file for complete search history.

(56) References Cited

U.S. PATENT DOCUMENTS

| | | | | |
|---|---|---|---|---|
| 2007/0122626 | A1* | 5/2007 | Qin | C08G 18/758 428/423.1 |
| 2010/0210745 | A1* | 8/2010 | McDaniel | C09D 7/48 521/55 |
| 2010/0210750 | A1 | 8/2010 | Valeri | |
| 2010/0261018 | A1* | 10/2010 | Turshani | C09J 133/16 522/42 |
| 2010/0285312 | A1* | 11/2010 | Mizuno | C08L 83/00 428/355 R |
| 2017/0357032 | A1* | 12/2017 | Valeri | C08J 7/043 |
| 2018/0009953 | A1* | 1/2018 | Lu | C08L 83/00 |
| 2018/0086955 | A1* | 3/2018 | Fujita | C09J 133/10 |
| 2018/0113239 | A1* | 4/2018 | Valeri | C08L 75/04 |
| 2018/0299598 | A1* | 10/2018 | Kim | B32B 27/28 |
| 2019/0111641 | A1* | 4/2019 | Coue | B32B 7/12 |
| 2019/0219735 | A1 | 7/2019 | Berzon | |

FOREIGN PATENT DOCUMENTS

| | | | | |
|---|---|---|---|---|
| JP | 2004225022 A | * | 8/2004 | |
| JP | 2015117265 A | * | 6/2015 | |
| JP | 2016193605 A | * | 11/2016 | B32B 15/20 |
| WO | WO-2018051173 A1 | * | 3/2018 | B29D 11/00009 |

OTHER PUBLICATIONS

Machine translation of JP-2004225022-A (Year: 2004).*
Machine translation of JP 2015117265A (Year: 2015).*
Extended Search Report for EP 20305489.5, Nov. 2, 2020, 9 pages.

* cited by examiner

PRIMER FOR OPHTHALMIC LENSES

This application claims priority to EP patent application No. 20305489.5 filed 13 May 2020, the entire contents of which is hereby incorporated by reference.

BACKGROUND

Field of the Disclosure

The present disclosure relates to the field of ophthalmic lenses, including functional element-containing ophthalmic lenses for spectacles and sunglasses.

Description of the Related Art

Added functions, such as light filtering or optical functions, can be integrated into an ophthalmic lens through the incorporation of a functional element such as films, wafers or laminates.

One of the problems associated with integrating a thermoplastic-based functional element into an ophthalmic thermoset lens is compatibility of the thermoplastic functional element with the lens casting material, or surrounding lens substrate. The functional element should not be damaged by the lens casting material and should have good adhesion. Compatibility issues may arise during the manufacturing process, during the finishing process, or during use. During the manufacturing process, it is highly desirable to develop some level of connectivity to the casting monomer. A strong adhesive bond can help to, for instance, improve component output and efficiency. During the finishing process, it is highly desirable to have some level of connectivity to the cast resin. Lens finishing processing steps include lens blocking, cribbing, back curve generation, back curve fining and polishing, lens edging, and deblocking. These processing steps can impart a high level of stress on a lens and can cause delamination of a functional element. There is a need to provide the customer with an ophthalmic lens having good adhesion and optical clarity.

Current cast CR39® polarizing lenses are manufactured using fragile polyvinyl alcohol (PVA) polarizing films with a thickness of approximately 30 µm. These thin polarizing films are susceptible to damage during handling. For instance, during the production of polarized lenses, many manual handling steps are required, which increases the potential for damage.

To this end, PVA films may be laminated within more durable films, such as triacetyl cellulose (TAC). A primer is applied onto the polarizing laminate for good adhesion in cast CR39® lenses, resulting in a more robust TAC/PVA/TAC polarizing element that provides improved handling durability over a single-layer of PVA film. Current industrial primers, however, when used with polycarbonate/PVA/polycarbonate laminates, can damage the optical quality of the polycarbonate (PC) polarizing laminate and do not provide adequate adhesion and may haze the laminate, thereby hindering manufacturing processes. Despite advancements in the field of polarizing film adhesive primers, there is a need for primers that offer improved adhesion and are functionally sound during manufacturing and finishing and across a variety of lens substrates. Such a primer will enable the production of robust functional elements that are capable of being universally applied within ophthalmic lenses.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present disclosure.

SUMMARY

The present disclosure relates to an ophthalmic lens.

According to an embodiment, the present disclosure further relates to an ophthalmic lens, comprising at least one polymerized lens substrate including at least one thermoset monomer, a functional component including at least one thermoplastic layer, a surface of the at least one thermoplastic layer facing the polymerized lens substrate, and a primer coating deposited onto the surface of the at least one thermoplastic film facing the polymerized lens substrate. In an embodiment, the primer coating includes at least one first reactive monomer, at least one second reactive monomer, and at least one photoactive catalyst.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
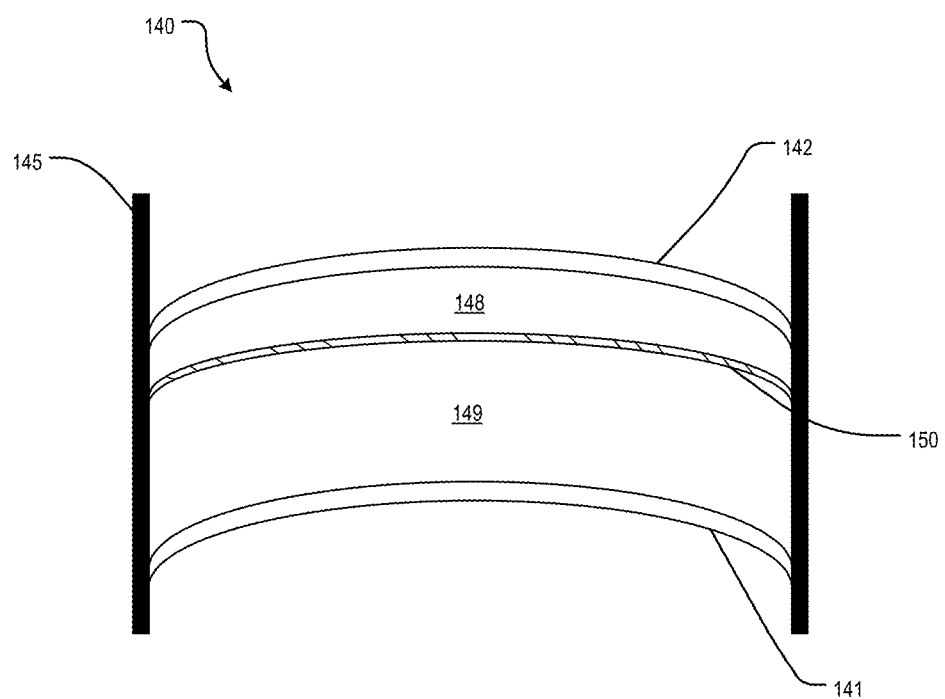
FIG. 1 is a cross-sectional schematic of a casting cell, according to an exemplary embodiment of the present disclosure.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The terms "about" and "approximately" are defined as being close to as understood by one of ordinary skill in the art. In one non-limiting embodiment the terms are defined to be within 10%, preferably, within 5%, more preferably, within 1%, and most preferably, within 0.5%.

The terms "laminate" and "laminated lens" or variations of these terms, when used in the claims and/or the specification, refer to a similar structure.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification, includes any measurable decrease or complete inhibition to achieve a desired result.

The term "effective," as that term is used in the specification and/or claims, means adequate to accomplish a desired, expected, or intended result.

The process of the present disclosure can "comprise," "consist essentially of," or "consist of" particular ingredients, components, compositions, etc., disclosed throughout the specification.

The terms "primer" and "primer coating" may be used interchangeably in the specification and/or the claims, but are intended to convey the same or similar materials.

The terms "functional component" and "functional element" may be used interchangeably in the specification and/or claims, but are intended to convey the same or similar materials. The term "functional component" or "functional element" may be used as a high-level term to refer to, as appropriate for given embodiments, each of (1) a thermoplastic layer, (2) a thermoplastic layer and a functional layer, and (3) a thermoplastic layer, a functional layer, and a thermoplastic layer.

The present disclosure relates to an ophthalmic lens featuring a lens substrate-independent primer for adhering a functional element to one or more lens substrates, wherein the functional element may be one of a film, a wafer, or a laminate.

This is particularly important as certain light filtering systems and optical functions of functional elements, such as color enhancement, polarization, blue light filtering, near infrared filtering, photochromic properties, and myopia defocus, among others, which have been established in polycarbonate (PC) lens substrates, are not readily available for use with thermoset lens substrates. For instance, functional elements that include polycarbonate films can be damaged by a thermoset lens substrate precursor during casting, resulting in reduced adhesion and a visibly-attacked and hazy ophthalmic lens. Therefore, it can be appreciated that significant development time is required to devise a solution where the light filters are compatible with the surrounding monomer host, or lens substrate precursor. Moreover, as thermoset lens substrates are prevalent in lens production, a technical solution where innovations in functional elements made for PC lens substrates could be readily implemented in thermoset lens substrates is of a great interest.

The introduction of functional elements having light filtering and/or optical functions within a lens substrate requires consideration of compatibility between the functional element and the surrounding host, or lens substrate, to achieve the desired performance. To this end, one approach incorporates the functional element within the lens substrate by arranging the functional element within a casting mold prior to addition of a lens substrate precursor. As an alternative to placing functional elements of triacetyl cellulose and polyvinyl alcohol inside of the casting cavity, which can be considered a lens substrate specific solution, a thermoplastic functional element including PC films may be placed inside of the casting cavity prior to addition of the lens substrate precursor, the intent thereof to provide a generally-applicable PC-based functional element that can be applied in a variety of lens substrate systems. However, even though adhesion between the PC-based functional element and the lens substrate may be adequate, because the lens substrate precursor is a monomer of CR39®, the PC-based functional element is degraded by contact with the CR39® lens substrate precursor. Degradation can lead to, among other things, haziness and lack of visual clarity.

Accordingly, an exemplary embodiment of the present disclosure describes primers that provide protection to the functional element and promote adhesion between the functional element and a thermoset lens substrate (via a thermoset lens substrate precursor). For instance, the primers may include an ultraviolet (UV)-curable epoxy- and acrylate-based primer.

According to an embodiment, the primer may be applied to one or more surfaces of a PC-based functional element and adhered to a corresponding one or more thermoset lens substrate, or one or more thermoset monomer.

According to an embodiment, the present disclosure describes a PC-based functional element treatment that prepares and protects surfaces of the PC-based functional element for contact with a thermoset lens substrate precursor.

The ophthalmic lens of the present disclosure provides benefits including (1) constant and homogenous light filtering performance across a variety of lens substrate materials (e.g., thermoplastic lens substrates, thermoset lens substrates), and (2) decreased complexity of manufacturing in handling multiple types of functional element and different lens substrate materials by using a single, generally-compatible functional element design.

Turning now to the Figures, FIG. 1 provides a cross-sectional schematic of a functional element 150 within a casting mold 140. The functional element 150 may comprise a resin that includes a light filter that imparts visual properties and optical functionality on the functional element 150. For instance, the dye may be one of a photochromic dye, a dichroic dye, a blue cut dye, an infrared cut dye, a UV cut dye, a selective wavelength cut dye, a color enhancement dye, or a combination thereof, among others. The functional element 150 may be a thickness of between 0.5 µm and 500 µm. In an embodiment, the functional element 150 may include at least one thermoplastic film, or at least one thermoplastic layer. The at least one thermoplastic film may be one of a PC film, a triacetyl cellulose (TAC) film, and a polyamide (PA) film, among others. In an embodiment, the casting mold 140 is substantially cylindrical.

In an embodiment, the casting mold 140 includes a gasket 145 and a first casting insert 141 and a second casting insert 142. The first casting insert 141 and the second casting insert 142 may define, therebetween, at least one void. During casting, the at least one void may be filled with lens substrate monomer. In an example, a desired ophthalmic lens may include a functional element having a lens substrate on either surface of the functional element. Such an instance reflects the schematic of FIG. 1. In this example, the at least one void may be a first void 148 and a second void 149, and lens substrate monomer may fill the first void 148 and the second void 149 in order to prepare the desired ophthalmic lens, a curvature of the lens substrates being defined by a curvature of the first casting insert 141 and a curvature of the second casting insert 142. In another example, a desired ophthalmic lens may include a functional element having a lens substrate on only a single surface of the functional element. In this example, the functional element may abut either of the first casting insert 141 or the second casting insert 142 and the at least one void may be either of the first void 148 or the second void 149. The lens substrate monomer may fill the first void 148 or the second void 149 in order to prepare the desired ophthalmic lens, and a curvature of the lens substrate may be defined by either the first casting insert 141 or the second casting insert 142.

In an embodiment, the lens substrate monomer may be thermoset polyurethane, allyl diglycol carbonate, polythiourethane, episulfur polymers, epoxy, poly(meth)acrylates, polythiomethacrylates, or combinations thereof. The lens substrate of the ophthalmic lens may be a thermoset lens substrate.

In an embodiment, the curvature of the first casting insert 141 and the curvature of the second casting insert 142 may determine a lens power of an ophthalmic lens. For a semi-finished (SF) lens, a curvature along a convex side of the SF lens is fixed and a curvature along a concave side of the SF lens may be modified after casting by, for example, grinding and polishing.

In an embodiment, and prior to placement in the casting mold 140 and ophthalmic lens integration, the functional element 150 may be a flat functional element and can be thermoformed into a spherical dome shape of the thermoformed functional element 150 via, for example, a thermoforming machine. During thermoforming, the flat functional element can be placed onto a heated thermoforming insert, and a vacuum force can be applied to secure the flat functional element to the thermoforming insert. By adjusting a temperature of the applied heat and a force of the applied vacuum, the flat functional element can be formed to the curved shape of the thermoforming insert to produce the thermoformed functional element 150.

In an embodiment, thermoforming a flat functional element can produce a curved structure and define a curvature of either or both surfaces of the functional element.

According to an embodiment, the functional element 150 of FIG. 1, in order to improve adherence between the functional element 150 and the lens substrate monomer, as introduced above, the functional element 150 may be treated by a primer coating on at least one surface of the functional element 150.

Figure 2A:
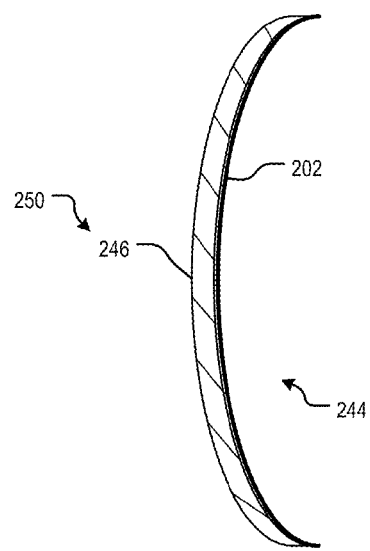
FIG. 2A is an illustration of a treated functional element of an ophthalmic lens, according to an exemplary embodiment of the present disclosure.
Figure 2B:
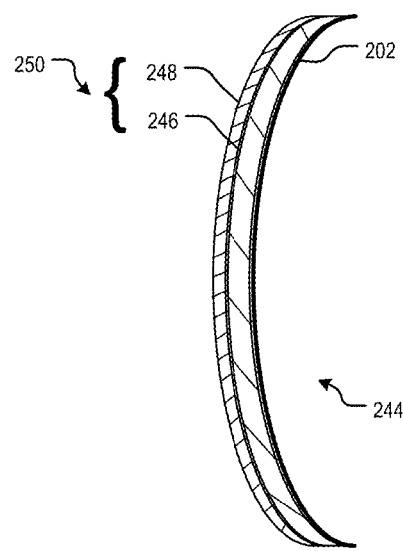
FIG. 2B is an illustration of a treated functional element of an ophthalmic lens, according to an exemplary embodiment of the present disclosure.
Figure 2C:
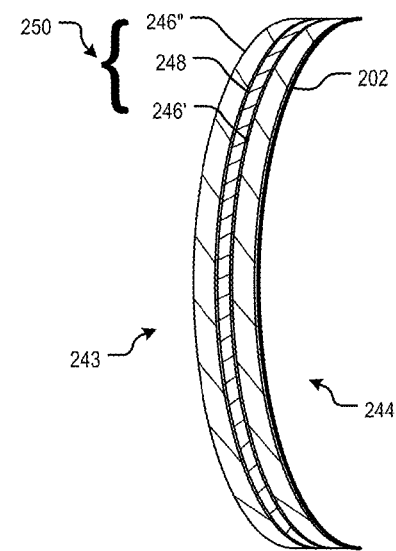
FIG. 2C is an illustration of a treated functional element of an ophthalmic lens, according to an exemplary embodiment of the present disclosure.

Though subsequent Figures will describe methods of applying the primer coating, FIG. 2A through FIG. 2C introduces illustrations of a variety of treated functional elements.

For instance, FIG. 2A describes a functional element 250 comprising a single thermoplastic film 246. The single thermoplastic film 246 may include a primer coating 202 on a concave surface 244 of the functional element 250. The at least one thermoplastic film 246 may be one of a PC film, a TAC film, and a PA film, among others.

FIG. 2B describes a functional element 250 comprising a thermoplastic film 246 and a functional film 248. The functional element 250 may include a primer coating 202 on a concave surface 244 of the thermoplastic film 246 of the functional element 250. The at least one thermoplastic film 246 may be a one of a PC film, a TAC film, and a PA film, among others. The functional film 248 may be one of a polyvinyl alcohol (PVA) film, a thermoplastic polyurethane (TPU) film, and a polyether block amide (PEBA) film, among others. In an example, the at least one thermoplastic film 246 and/or the functional film 248 may comprise a resin that includes a light filter that imparts visual properties and optical functionality on the functional element 250. The functional element 250 may be a PVA/PC functional element, a PVA/TAC functional element, or a PVA/PA functional element, among others. In another example, the dye is a photochromic dye within the functional film 247, and the functional film 247 is either of a PEBA film or a TPU film. The functional element 250 derived therefrom may be a TPU/PC functional element, a TPU/TAC functional element, a PEBA/TAC functional element, a TPU/PA functional element, or a PEBA/PA functional element, among others. The functional element 250 may have a thickness of between 0.5 µm and 500 µm after lamination of the functional film 248 with the at least one thermoplastic film 246.

FIG. 2C describes a functional element 250 comprising a first thermoplastic film 246', a functional film 248, and a second thermoplastic film 246". The functional element 250 may include a primer coating 202 on a concave surface 244 of the first thermoplastic film 246' of the functional element 250 or on a convex surface 243 of the second thermoplastic film 246" of the functional element 250. In an example, the functional element 250 may include the primer coating 202 on both of the concave surface 244 of the first thermoplastic film 246' of the functional element 250 and on the convex surface 243 of the second thermoplastic film 246" of the functional element 250. The first thermoplastic film 246' and/or the second thermoplastic film 246" may be a one of a PC film, a TAC film, and a PA film, among others. The functional film 248 may be one of a polyvinyl alcohol (PVA) film, a thermoplastic polyurethane (TPU) film, and a polyether block amide (PEBA) film, among others. In an example, one or more of the first thermoplastic film 246', the functional film 248, and the second thermoplastic film 246" may comprise a resin that includes a light filter that imparts visual properties and optical functionality on the functional element 250. The functional element 250 may be a PC/PVA/PC functional element, a TAC/PVA/TAC functional element, or a PA/PVA/PA functional element, among others. In another example, the dye is a photochromic dye within the functional film 248, and the functional film 248 is either of a PEBA film or a TPU film. The functional element 250 derived therefrom may be a PC/TPU/PC functional element, a TAC/TPU/TAC functional element, a TAC/PEBA/TAC functional element, a PA/TPU/PA functional element, or a PA/PEBA/PA functional element, among others. The functional element 250 may have a thickness of between 0.5 μm and 500 μm after lamination of the functional film 248 with the first thermoplastic film 246' and the second thermoplastic film 246".

Figure 3A:
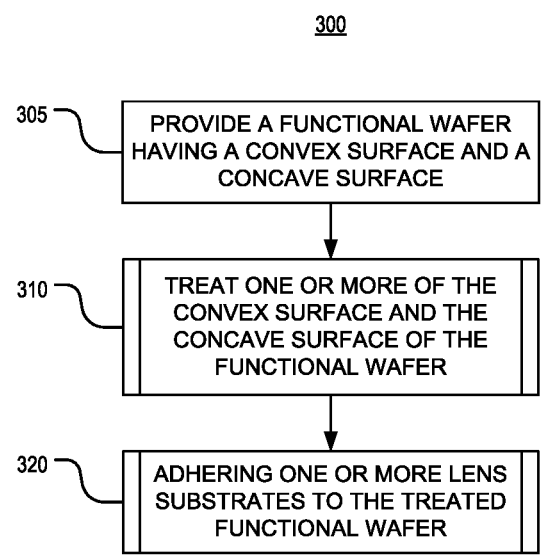
FIG. 3A is a flow diagram of a method of a functional element of an ophthalmic lens, according to an exemplary embodiment of the present disclosure.
Figure 3B:
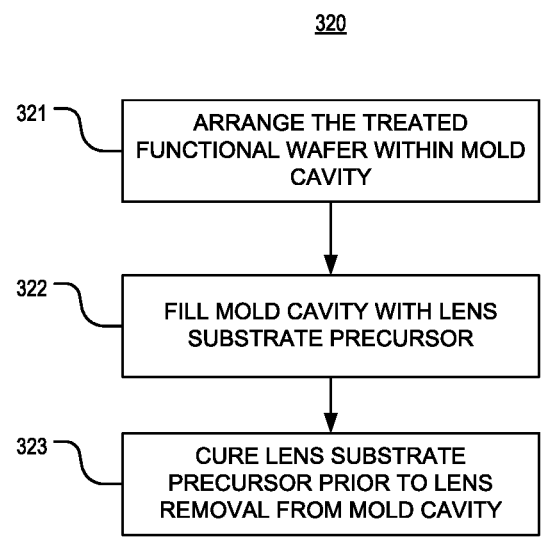
FIG. 3B is a flow diagram of a sub process of a method of a functional element of an ophthalmic lens, according to an exemplary embodiment of the present disclosure.
Figure 3C:
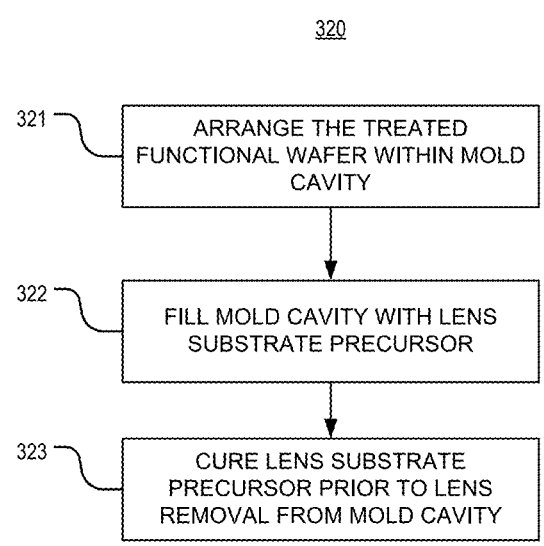

Turning now to FIG. 3A and FIG. 3B, and as described in FIG. 1, the casting mold may include one or more voids according to a lens substrate design of an ophthalmic lens. FIG. 3A and FIG. 3B describe a method of preparing an ophthalmic lens in view of these one or more voids and according to an exemplary embodiment of the present disclosure. It can be appreciated that the functional elements described above with reference to FIG. 2A through FIG. 2C may each be implementations of the flow diagrams of FIG. 3A and FIG. 3B.

With reference to FIG. 3A, method 300 is a high level, generalized flow diagram for preparing an ophthalmic lens having a functional element adhered to one or more lens substrates, wherein the adherence is facilitated by treatment of one or more surfaces of the functional element.

At step 305 of method 300 and in view of FIG. 1, a functional element having a convex surface and a concave surface may be provided.

At sub process 310 of method 300, one or more of the convex surface and the concave surface of the functional element may be treated. Treatment may include application of a primer to the one or more of the convex surface and the concave surface of the functional element. Sub process 310 of method 300 will be described in further detail with reference to FIG. 4B and subsequent Figures.

At sub process 320 of method 300, the treated functional element may be adhered to one or more lens substrates. The adherence may include forming the one or more lens substrates from a lens substrate precursor within one or more voids of a casting mold, as shown in FIG. 1.

In adhering the treated functional element to the one or more lens substrates, and with reference now to FIG. 3B, the treated functional element may be adhered to one or more lens substrates at sub process 320 of method 300. At step 321 of sub process 320, the treated functional element may be arranged within a casting mold according to a desired design of an ophthalmic lens. For instance, the treated functional element may be arranged such that one or more voids remain. At step 322 of sub process 320, the one or more voids may be filled with a lens substrate precursor (or monomer). The lens substrate precursor may be uncured thermoset polymer such as a CR39® lens substrate precursor. Following injection of the lens substrate precursor into the one or more voids of the casting mold, the lens substrate precursor may be allowed to cure to a desired hardness, at step 323 of sub process 320, prior to removal of the ophthalmic lens from the casting mold. It can be appreciated that sub process 310 of method 300 is consistent for each of the remaining embodiments of the present disclosure, and as such, description with reference to subsequent Figures will be omitted for brevity.

Figure 4A:
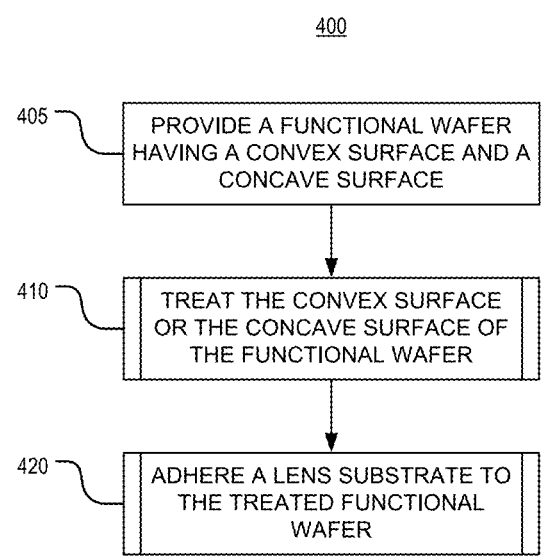
FIG. 4A is a flow diagram of a method of a functional element of an ophthalmic lens, according to an exemplary embodiment of the present disclosure.

With reference now to FIG. 4A, description of an exemplary embodiment of the present disclosure is provided, wherein a functional element including a first thermoplastic film, a functional film, and a second thermoplastic film, is adhered to a single lens substrate on one surface of the functional element.

At step 405 of method 400, a functional element having a convex surface and a concave surface may be provided.

At sub process 410 of method 400, either the convex surface or the concave surface of the functional element may be treated. Treatment may include application of a primer to either the convex surface or the concave surface of the functional element. Sub process 410 of method 400 will be described in further detail with reference to FIG. 4B.

At sub process 420 of method 400, the treated functional element may be adhered to a lens substrate in a similar manner to that of FIG. 3B. The adherence may include forming the lens substrate from a lens substrate precursor within a void of a casting mold and in contact with a surface of the functional element, as shown in FIG. 1.

Figure 4B:
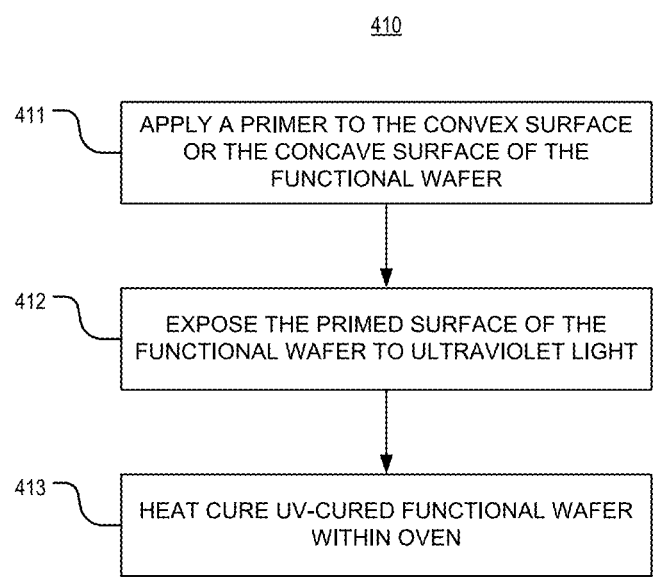
FIG. 4B is a flow diagram of a sub process of a method of a functional element of an ophthalmic lens, according to an exemplary embodiment of the present disclosure.

With reference now to FIG. 4B, sub process 410 of method 400 describes treatment of either the convex surface or the concave surface of the functional element. At step 411 of sub process 410, a primer coating may be applied to either the convex surface or the concave surface of the functional element.

In an embodiment, the primer coating may be one of a plurality of primers that provide robust adhesion between the functional element and the lens substrate. The primers may be formulated to include components that promote bonding to the functional element and the lens substrate. While conventional primers rely on relatively weak primer-primer and primer-substrate electrostatic forces for adhesion, the primers of the present disclosure may bind to the surfaces to which they are applied. The net result of the primers is enhanced adhesive strength and durability.

According to an embodiment, the primers disclosed herein are particularly useful for adhering a functional element including a PC film to a cast CR39® lens substrate. The primers may be designed to provide a level of penetration into a surface of the PC film of the functional element or other element layer. The PC film-penetrating quality of the primers contributes to its adhesive properties.

In an embodiment, a primer as disclosed herein may include at least one first reactive monomer, at least one second reactive monomer, and at least one photoactivatable catalyst. In an embodiment, the primer further includes a solvent. The at least one first reactive monomer may be a mixture of at least one acrylic monomer selected from the group consisting of monoacrylate monomers and diacrylate monomers and at least one acrylate monomer selected from the group consisting of triacrylate monomers through hexaacrylate monomers. In an example, a reactive group of the at least one second reactive monomer may be an epoxy. The at least one second reactive monomer may be an epoxy monomer selected from glycidylethers of polyhydric alkanols. The at least one photoactivatable catalyst may be a light-activated catalyst. The light may be a UV light. The at least one photoactivatable catalyst may be a cationic catalyst and may be selected from the group consisting of aromatic onium salts and iron arene salt complexes. In an embodiment, the primer may further include, as a component of the photoactivatable catalyst, a free radical photoinitiator. The free radical photoinitiator may be one selected from the group consisting of benzophenone and acetophenone.

In an example, the at least one first reactive monomer may be an at least one monomer that is capable of reacting with a lens substrate monomer, or lens substrate precursor. The at least one monomer may be included in an amount of between 0.25 wt. % and 75 wt. %, and preferably between 10 wt. % and 50 wt. % based on a total weight of the at least one second reactive monomer and the at least one monomer present in the composition. In an embodiment, the at least one monomer may be a mixture of acrylate monomers.

According to an embodiment, the at least one second reactive monomer may have a molecular weight of between about 50 and 1,000. The at least one second reactive monomer may be included in an amount of between 1 wt. % and 90 wt. %, and preferably between 50 wt. % and 90 wt. %, based on a total weight of the at least one second reactive monomer and the at least one first reactive monomer. In an embodiment, the at least one second reactive monomer may be a mixture of epoxy resin and cycloaliphatic epoxy. In an embodiment, the at least one second reactive monomer may be an alkoxysilane such as allyltrimethoxysilane, allyltriethoxysilane, allylmethacrylate, and vinyltrimethoxysilane.

According to an embodiment, the at least photoactivatable catalyst may be included in an amount of between 0.1 wt. % and 10 wt. %, and preferably between 0.1 wt. % and 3 wt. %. In an embodiment, the at least one photoactivatable catalyst may be a mixture of a cationic photoinitiator and a free radical photoinitiator.

In an embodiment, the primer may include a curable composition. Of course, a curing process may lead to chemical reactions that alter certain ones of the primer components. In some embodiments, the primer component functional groups may be selected in order to interact with the functional element and to react with the lens substrates with which they will adhere. In this way, a primer composition as disclosed herein can be designed and tuned to provide adhesion for the specific functional element and/or lens substrate target materials.

In some embodiments, a solvent may be used to dissolve the primer components. When present, the solvent may be included in an amount of between 20 wt. % and 99 wt. %. In an example, the solvent is an alcohol such as methanol, ethanol, n-propanol, and isopropanol, among others. In another example, the solvent may be one of a ketone, an acetate solvent, acetone, methyl ethyl ketone, ethyl acetate, cyclopentanone and cyclohexanone, and any combination thereof.

According to an embodiment, the at least one first reactive monomer may exhibit the same chemical functionality as the lens substrate monomer. When the at least one first reactive monomer exhibits the same chemical functionality as the lens substrate monomer, the at least one first reactive monomer aids in ensuring compatibility of the primer composition with the polymerized lens substrate monomer, also referred to herein as the lens substrate precursor. In some embodiments, the at least one first reactive monomer has different chemical functionality from the lens substrate polymerized monomer. Moreover, the at least one first reactive monomer may have different chemical functionality from the lens substrate monomer but may still be able to react with the polymerized lens substrate monomer. In this case, the at least one first reactive monomer is selected to include the same reactive functional group as the lens substrate monomer. For example, a lens substrate monomer may primarily consist of allyl diglycol carbonate (i.e. CR39®), and the at least one first reactive monomer may be diallyl ether. Although both lens substrate monomer and at least one first reactive monomer are different compounds, they may react with each other by virtue of their reactive functional group. In some aspects, the at least one first reactive monomer comprises a reactive group functionality of 1 or more, and preferably at least 2. Increasing the reactive functionality increases the types of functional groups with which the at least one first reactive monomer can react. In an example, the at least one first reactive monomer may include a reactive group or groups selected from the group consisting of allyl, vinyl, acrylic, thiol, isocyanate, epoxy and amine.

In some embodiments, the at least one second reactive monomer has a reactive functionality of 1 or more and preferably 2. Increasing the reactive functionality increases the quantity or types of functional groups with which the at least one second reactive monomer can react. In some embodiments, the at least one second reactive monomer is an epoxy monomer. In some embodiments, the at least one second reactive monomer is a functional (meth)acrylate-based resin.

In some embodiments, the functional element is a polarizing element. The polarizing element may include at least one thermoplastic film and a PVA film as a polarizing layer. The at least one thermoplastic film may be PC. In some embodiments, the ophthalmic lens substrate monomer may be allyl diglycol carbonate. The at least one first reactive monomer of the primer may react with the lens substrate monomer to provide chemical bonds that form the basis of strong adhesion between the functional element and the lens substrate.

According to an embodiment, the primers may be applied to a PC-based functional element by flow coating, spin coating, gravure coating, slot die coating, or other means known to those of skill in the art. For instance, the primer may be applied by draw down board method with Mayer rods, wherein the Mayer rods were wire wound MR #3.5, the diameter of the wire determining how the thickness of primer applied. In some aspects, wherein a solvent is included, the applied primer may be dried for a predetermined time, for example, between about 15 seconds and about 2 minutes at a predetermined temperature ranging, for example, from about 40° C. to about 80° C. in order to remove the solvent from the primer composition. Other drying conditions known to those of skill in the art may be employed to remove the solvent, if employed. According to an embodiment, the applied primer may be allowed to fully or partially dry after application to the functional element.

Table 1 and Table 2 provide exemplary compositions of the primers described herein.

It can be appreciated that the values should be considered approximate and in view of the heretofore described composition ranges.

TABLE 1

| Component | % of Composition |
| --- | --- |
| Second Reactive Monomer | 74.58 |
| First Reactive Monomer | 24.82 |
| Photoactivatable catalyst (cationic) | 0.4 |
| Photoactivatable catalyst (free radical) | 0.2 |

TABLE 2

| Component | % of Composition |
| --- | --- |
| Second Reactive Monomer | 56.1 |
| First Reactive Monomer | 18.5 |
| Solvent | 25.1 |
| Photoactivatable catalyst (cationic) | 0.3 |

The applied primer may be exposed to an amount of UV light and/or an increase in temperature sufficient to activate the photoactivatable catalyst and initiate curing of the applied primer.

In an embodiment, at step 412 of sub process 410, the primed surface of the functional element may be at least partially cured by exposure to electromagnetic radiation. The electromagnetic radiation may be UV light, infrared light, or visible light, among others. In an example, the electromagnetic radiation is UV light provided by a Heraeus oblelight F300S with a H+ bulb. Power, energy, and exposure time may be selected to optimize curing. Typical, non-limiting curing conditions include about 7 feet/min (UVA~1500 mJ/cm$^2$, ~1200 mW/cm$^2$) to about 21 feet/min (500 mJ/cm$^2$, 1100 mW/cm$^2$).

At step 413 of sub process 410, the UV-cured primer on the surface of the functional element may be further cured by exposure to heat. In an example, the heat may be applied by an infrared oven. The infrared oven may be heated to 500° F., for instance, and the UV-cured primer on the surface of the functional element may be exposed to the heat for a predetermined time. For instance, the predetermined time may be, for example, between 5 seconds and 60 seconds, and preferably about 30 seconds. Of course, it can be appreciated that the temperature and predetermined time for heating the UV-cured primer on the surface of the functional element may be based on a desired hardness. In certain applications, a less than 100% cured primer may be desired in order to promote adhesion.

Figure 5A:
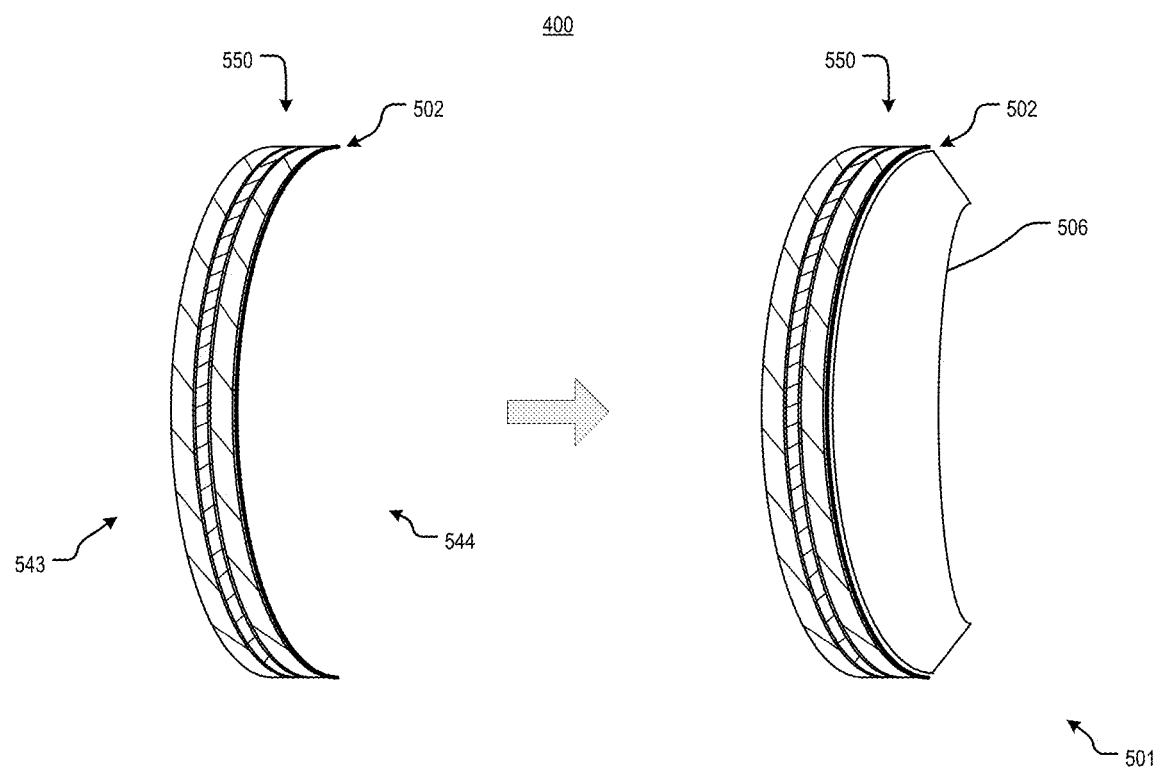
FIG. 5A is an illustration of a method of a functional element of an ophthalmic lens, according to an exemplary embodiment of the present disclosure.

In view of the flow diagrams of FIG. 4A and FIG. 4B, FIG. 5A provides an exemplary illustration of method 400, wherein adherence between a functional element 550 and a lens substrate 506 is shown, the functional element 550 including a first thermoplastic film, a functional film, and a second thermoplastic film. In an embodiment, it may be desired to produce an ophthalmic lens 501 having the lens substrate 506 only on a concave surface 544 of the functional element 550. Accordingly, a primer 502 may be applied to, as the treated surface of the functional element 550, the concave surface 544 of the functional element 550. As described in FIG. 4A, the functional element 550 may be arranged within a casting mold such that a convex surface 543 of the functional element 550 is in contact with a concave insert of the casting mold and a void exists between the treated surface of the functional element 550 and a convex casting insert of the casting mold. Following introduction and at least partial curing of a lens substrate precursor, as described in FIG. 3B, the treated surface of the functional element 550 and adhered lens substrate 506 may be removed from the casting mold. As desired, the ophthalmic lens 501 may include the lens substrate 506 on the concave surface 544 of the functional element 550. The lens substrate 506 may be, in an example, a thermoset lens substrate such as CR39®.

Figure 5B:
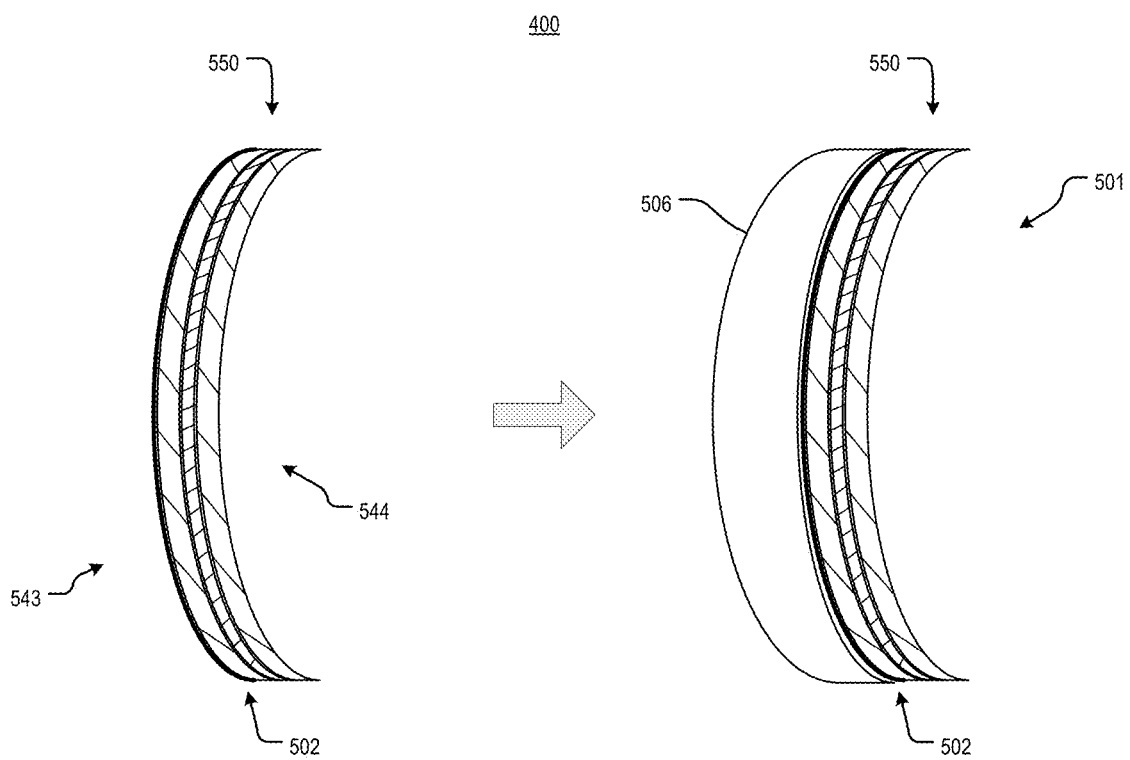
FIG. 5B is an illustration of a method of a functional element of an ophthalmic lens, according to an exemplary embodiment of the present disclosure.

In view of the flow diagrams of FIG. 4A and FIG. 4B, FIG. 5B provides an exemplary illustration of method 400, wherein adherence between a functional element 550 and a lens substrate 506 is shown, the functional element 550 including a first thermoplastic film, a functional film, and a second thermoplastic film. In an embodiment, it may be desired to produce an ophthalmic lens 501 having the lens substrate 506 only on a convex surface 543 of the functional element 550. Accordingly, a primer 502 may be applied to, as the treated surface of the functional element 550, the convex surface 543 of the functional element 550. As described in FIG. 4A, the functional element 550 may be arranged within a casting mold such that a concave surface 544 of the functional element 550 is contact with a convex casting insert of the casting mold and a void exists between the treated surface of the functional element 550 and a concave cavity insert of the casting mold. Following introduction and at least partial curing of a lens substrate precursor, as described in FIG. 3B, the treated surface of the functional element 550 and adhered lens substrate 506 and may be removed from the casting mold. As desired, the ophthalmic lens 501 may include the lens substrate 506 on the convex surface 543 of the functional element 550. The lens substrate 506 may be, in an example, a thermoset lens substrate such as CR39®.

Figure 6A:
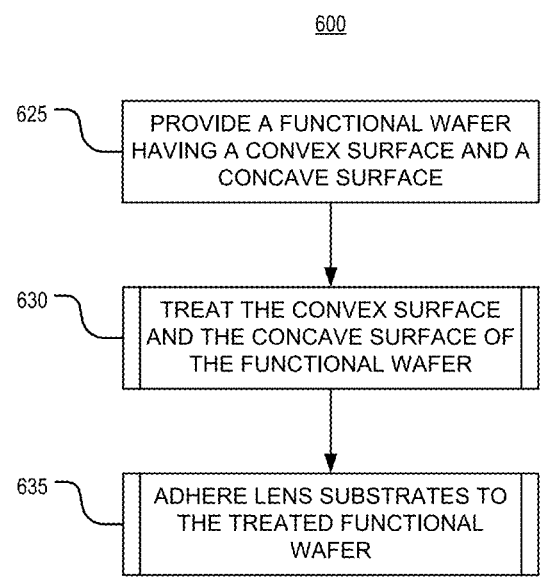
FIG. 6A is a flow diagram of a method of a functional element of an ophthalmic lens, according to an exemplary embodiment of the present disclosure.

With reference now to FIG. 6A, a description of an exemplary embodiment of the present disclosure is provided, wherein a functional element including a first thermoplastic film, a functional film, and a second thermoplastic film is adhered to a lens substrate on two surfaces of the functional element.

At step 625 of method 600, a functional element having a convex surface and a concave surface may be provided.

At sub process 630 of method 600, the convex surface and the concave surface of the functional element may be treated. Treatment may include application of a primer to the convex surface and the concave surface of the functional element. Sub process 630 of method 600 will be described in further detail with reference to FIG. 6B.

At sub process 635 of method 600, the treated functional element may be adhered to a lens substrate in a similar manner to that of FIG. 3B. The adherence may include forming the lens substrate from a lens substrate precursor within a void of a casting mold, as shown in FIG. 1.

Figure 6B:
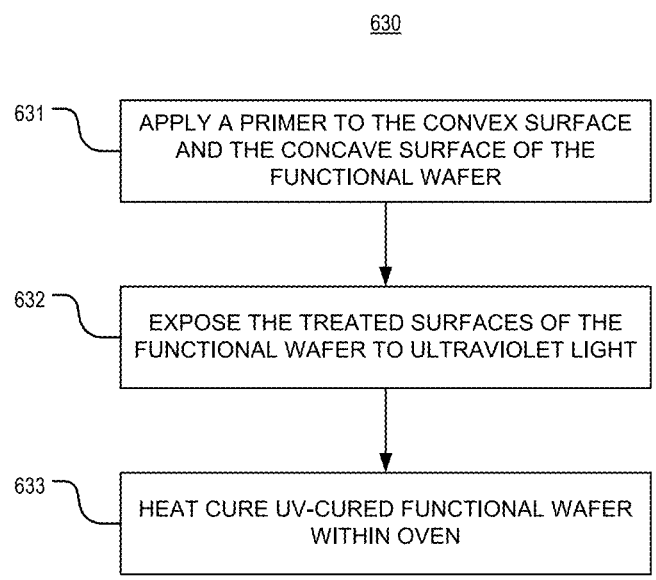
FIG. 6B is a flow diagram of a sub process of a method of a functional element of an ophthalmic lens, according to an exemplary embodiment of the present disclosure.

With reference now to FIG. 6B, sub process 630 of method 600 describes treatment of the convex surface and the concave surface of the functional element.

At step 631 of sub process 630, a primer may be applied to the convex surface and the concave surface of the functional element.

According to an embodiment, the primer may be one of a plurality of primers that provide robust adhesion between the surfaces of the functional element and the lens substrate. The primers may be formulated to include components that promote bonding to the functional element and the lens substrate. While conventional primers rely on relatively weak primer-primer and primer-substrate electrostatic forces for adhesion, the primers of the present disclosure may bind to the surfaces to which they are applied. The net result of the primers is enhanced adhesive strength and durability.

According to an embodiment, the primers disclosed herein are particularly useful for adhering a functional element including a PC film to a cast CR39® lens substrate. The primers may be designed to provide a level of penetration into a surface of the PC film of the functional element or other element layer. The PC film-penetrating quality of the primers contributes to its adhesive properties.

In an embodiment, a primer as disclosed herein may include at least one first reactive monomer, at least one second reactive monomer, and at least one photoactivatable catalyst. In an embodiment, the primer further includes a solvent. The at least one first reactive monomer may be a mixture of at least one acrylic monomer selected from the group consisting of monoacrylate monomers and diacrylate monomers and at least one acrylate monomer selected from the group consisting of triacrylate monomers through hexaacrylate monomers. In an example, a reactive group of the at least one second reactive monomer may be an epoxy. The at least one second reactive monomer may be an epoxy monomer selected from glycidylethers of polyhydric alkanols. The at least one photoactivatable catalyst may be a light-activated catalyst. In an example, the light activator may be electromagnetic radiation such as UV light, visible light, or infrared light, among others. The at least one photoactivatable catalyst may be a cationic catalyst and may be selected from the group consisting of aromatic onium salts and iron arene salt complexes. In an embodiment, the primer may further include, as a component of the photoactivatable catalyst, a free radical photoinitiator. The free radical photoinitiator may be one selected from the group consisting of benzophenone and acetophenone.

In an example, the at least one first reactive monomer may be an at least one monomer that is capable of reacting with a lens substrate monomer. The at least one monomer may be included in an amount of between 0.25 wt. % and 75 wt. %, and preferably between 10 wt. % and 50 wt. % based on a total weight of the at least one second reactive monomer and the at least one monomer present in the composition. In an embodiment, the at least one monomer may be a mixture of acrylate monomers.

According to an embodiment, the at least one second reactive monomer may have a molecular weight of between about 5 and about 1,000. The at least one second reactive monomer may be included in an amount of between 1 wt. % and 90 wt. %, and preferably between 50 wt. % and 90 wt. %, based on a total weight of the at least one second reactive monomer and the at least one first reactive monomer. In an embodiment, the at least one second reactive monomer may be a mixture of epoxy resin and cycloaliphatic epoxy. In an embodiment, the at least one reactive monomer may be an alkoxysilane such as allyltrimethoxysilane, allyltriethoxysilane, allylmethacrylate, and vinyltrimethoxysilane.

According to an embodiment, the at least photoactivatable catalyst may be included in an amount of between 0.1 wt. % and 10 wt. %, and preferably between 0.1 wt. % and 3 wt. %. In an embodiment, the at least one photoactivatable catalyst may be a mixture of a cationic photoinitiator and a free radical photoinitiator.

In an embodiment, the primer may include a curable composition. Of course, a curing process may lead to chemical reactions that alter certain ones of the primer components. In some embodiments, the primer component functional groups may be selected in order to interact with the functional element and to react with the lens substrates with which they will adhere. In this way, a primer composition as disclosed herein can be designed and tuned to provide adhesion for the specific functional element and/or lens substrate target materials.

In some embodiments, a solvent may be used to dissolve the primer components. When present, the solvent may be included in an amount of between 20 wt. % and 99 wt. %. In an example, the solvent is an alcohol such as methanol, ethanol, n-propanol, and isopropanol, among others. In another example, the solvent may be a ketone, acetate solvent, acetone, methyl ethyl ketone, ethyl acetate, cyclopentanone and cyclohexanone, and any combination thereof.

According to an embodiment, the at least one first reactive monomer may be of the same chemical functionality as the lens substrate monomer. When the at least one first reactive monomer is of the same chemical functionality as the lens substrate monomer, the at least one first reactive monomer aids in ensuring compatibility of the primer composition with the polymerized lens substrate monomer, also referred to herein as the lens substrate precursor. In some embodiments, the at least one first reactive monomer has a different chemical functionality from the lens substrate monomer. The at least one first reactive monomer may have different chemical functionality from the lens substrate monomer, but may still be able to react with the lens substrate monomer. In this case, the at least one first reactive monomer is selected to include the same reactive functional group as the lens substrate monomer. For example, a lens substrate monomer may primarily consist of allyl diglycol carbonate (i.e. CR39®), and the at least one first reactive monomer may be diallyl ether. Although the lens substrate monomer and the at least one first reactive monomer are different compounds, they may react with each other by virtue of their reactive functional group. In some aspects, the at least one first reactive monomer comprises a reactive group functionality of 1 or more, and preferably at least 2. Increasing the reactive functionality increases the types of functional groups with which the at least one first reactive monomer can react. The at least one first reactive monomer may include a reactive group or groups selected from the group consisting of allyl, vinyl, acrylic, thiol, isocyanate, epoxy and amine.

In some embodiments, the at least one second reactive monomer has a reactive functionality of 1 or more and preferably 2. Increasing the reactive functionality increases the quantity or types of functional groups with which the at least one second reactive monomer can react. In some embodiments, the at least one second reactive monomer is an epoxy monomer. In some embodiments, the at least one second reactive monomer is a functional (meth)acrylate-based resin.

In some embodiments, the functional element is a polarizing element. The polarizing element may include at least one thermoplastic film and a PVA film as a polarizing layer. The at least one thermoplastic film may be PC. In some embodiments, the ophthalmic lens substrate monomer may be allyl diglycol carbonate. The at least one first reactive monomer of the primer may react with the lens substrate monomer to provide chemical bonds that form the basis of strong adhesion between the functional element and the lens substrate.

According to an embodiment, the primers may be applied to a PC-based functional element by flow coating, spin coating, gravure coating, slot die coating, or other means known to those of skill in the art. For instance, the primer may be applied by draw down board method with Mayer rods, wherein the Mayer rods were wire wound MR #3.5, the diameter of the wire determining how the thickness of primer applied. In some aspects, and when solvent is included within the primer, the applied primer may be dried for a predetermined time of, for example, between about 15 seconds and about 2 minutes at a predetermined temperature of between, for example, about 40° C. and about 80° C. in order to remove the solvent from the primer composition. Other drying conditions known to those of skill in the art may be employed to remove the solvent when the solvent is present in the primer. According to an embodiment, the applied primer may be allowed to fully or partially dry after application to the functional element.

Exemplary compositions of the primers are described above with reference to Table 1 and Table 2.

The applied primer may be exposed to an amount of UV light and/or an increase in temperature sufficient to activate the photoactivatable catalyst and initiate the curing process. Accordingly, in an embodiment, at step 632 of sub process 630, the primed surfaces of the functional element may be at least partially cured by exposure to electromagnetic radiation. The electromagnetic radiation may be UV light, infrared light, or visible light, among others. In an example, the electromagnetic radiation is UV light provided by a Heraeus obelight F300S with a H+ bulb. Power, energy, and exposure time may be selected to optimize curing. Typical, non-limiting curing conditions include about 7 feet/min (UVA~1500 mJ/cm$^2$, ~1200 mW/cm$^2$) to about 21 feet/min (500 mJ/cm$^2$, 1100 mW/cm$^2$).

At step 633 of sub process 630, the UV-cured primer on the concave surface and the convex surface of the functional element may be further cured by exposure to heat. In an example, the heat may be applied by an infrared oven. The infrared oven may be heated to 500° F., for instance, and the UV-cured primer on the concave surface and the convex surface of the functional element may be exposed to the heat for a predetermined time. For instance, the predetermined time may be between 5 seconds and 60 seconds, and preferably about 30 seconds. Of course, it can be appreciated that the temperature and predetermined time for heating the UV-cured primer on the concave surface and the convex surface of the functional element may be based on a desired hardness. In certain applications, a less than 100% cured primer may be desired in order to promote adhesion.

Figure 7:
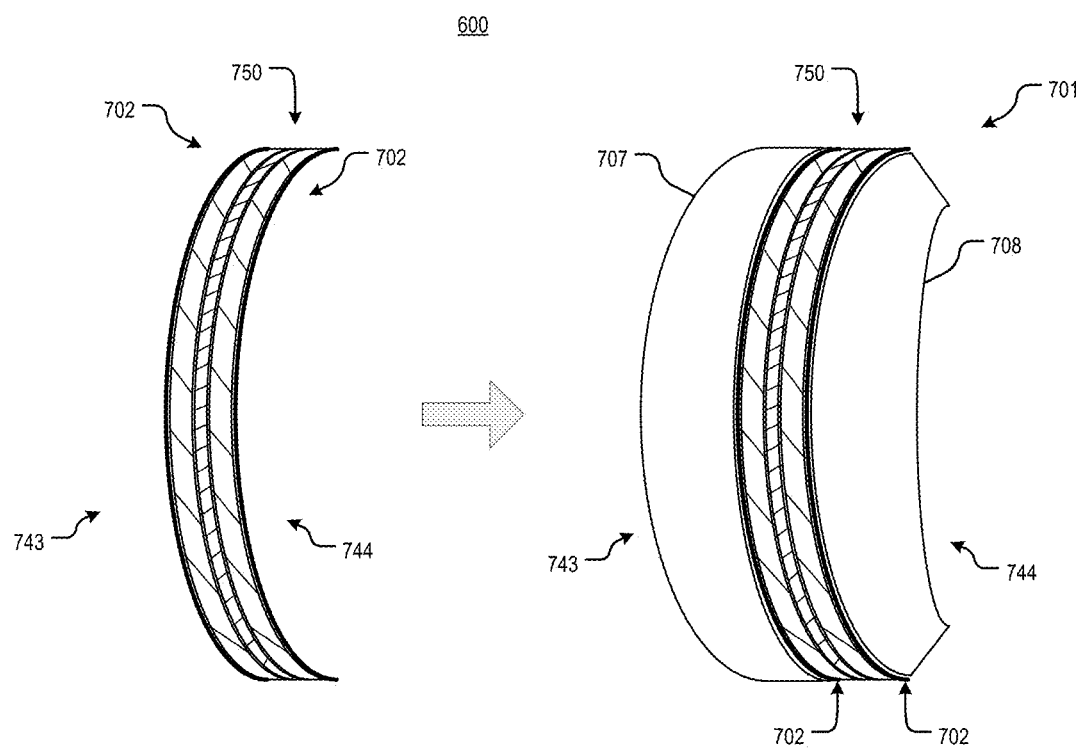
FIG. 7 is an illustration of a method of a functional element of an ophthalmic lens, according to an exemplary embodiment of the present disclosure.

In view of the flow diagrams of FIG. 6A and FIG. 6B, FIG. 7 provides an exemplary illustration of method 600, wherein adherence between a functional element 750 and a lens substrate 706 is shown, the functional element 750 including a first thermoplastic film, a functional film, and a second thermoplastic film. In an embodiment, it may be desired to produce an ophthalmic lens 701 having the lens substrate 706 on both of a concave surface 744 of the functional element 750 and a convex surface 743 of the functional element 750. Accordingly, a primer 702 may be applied to, as the treated surfaces of the functional element 750, the concave surface 744 of the functional element 750 and the convex surface 743 of the functional element 750.

As described in FIG. 6A, the functional element 750 may be arranged within a casting mold such that a first predetermined distance remains between the convex surface 743 of the functional element 750 and a concave cavity insert of the casting mold and a second predetermined distance remains between the concave surface 744 of the functional element 750 and a convex cavity insert of the casting mold. In this way, voids of the casting mold may exist within space defined by the first predetermined distance and the second predetermined distance, treated surfaces of the functional element 750 being exposed thereto. Following introduction and at least partial curing of a lens substrate precursor within the voids, as described in FIG. 3B, the treated surfaces of the functional element 750 that are adhered to the lens substrate 706 may be removed from the casting mold. As desired, the ophthalmic lens 701 may include, as the lens substrates, a convex lens substrate 707 on the convex surface 743 of the functional element 750 and a concave lens substrate 708 on the concave surface 744 of the functional element 750. The convex lens substrate 707 and the concave lens substrate 708 may be, in an example, thermoset lens substrates such as CR39®.

As part of the present disclosure, specific examples are included below. The examples are for illustrative purposes only and are not intended to limit the invention. In fact, the examples may not be exemplary embodiments of the present disclosure but instead examples intended to provide contrast between non-limiting examples of the present disclosure and other practices in the field. Those of ordinary skill in the art will readily recognize parameters that can be changed or modified to yield essentially the same results.

EXAMPLES

For each of the subsequent Example, a base primer composition is first described.

REFERENCE BASE COMPOSITION #1 (Epoxy Acrylate Primer)

A reference base primer composition, defined as Base Composition #1, was formulated and composed of, as the at least one first reactive monomer, acrylate monomer and acrylate, as the at least one second reactive monomer, epoxy resins and acrylate monomers, and, as the at least one photoinitiator, a cationic photoinitiator and free radical photoinitiator, as shown in Table 3.

TABLE 3

| Component (Catalog) | Component (Family) | % of Composition (wt. %) |
| --- | --- | --- |
| UVR-6110 | Cycloaliphatic epoxy | 55.8 |
| Erisys GE-30 | Epoxy resin | 18.8 |
| SR-399 | Acrylate monomer | 16.6 |
| SR-339 | Acrylate | 8.21 |
| UVI-6976 | Cationic photoinitiator | 0.40 |
| DAROCUR 1173 | Free radical photoinitiator | 0.20 |

In an example, UVR-6110 is a 3,4-epoxy cyclohexyl methyl-3,4-epoxycyclohexylcarboxylate having a reactive group functionality of 2, Erisys GE-30 is a trimethylolpropane triglycidyl ether liquid epoxy having a reactive group functionality of 3, SR-399 is a dipentaerythritol pentaacrylate ester having a reactive group functionality of 5, SR-339 is a 2-phenoxyethyl acrylate having a reactive group functionality of 1, UVI-6976 is a mixed triarylsulfonium hexafluoroantimonate<60% in propylene carbonate, and Darocur 1173 is 2-Hydroxy-2-methyl-1-phenyl-propan-1-one.

Example 1

Primer 1 of Example 1 included REFERENCE BASE COMPOSITION #1 (90 wt. %) and allyl methacrylate (10 wt. %). Primer 1 was applied to both surfaces of a flat functional element which was then thermoformed to a desired curvature in order to generate an ophthalmic lens having a concave lens substrate and a convex lens substrate adhered to the functional element. Accordingly, Primer 1 was first applied to a first flat surface of the functional element, and UV-cured to tack free, as in FIG. 6B. The functional element having the treated first flat surface was then primed on the second flat surface of the functional element and cured, as described above. The primer was applied to each of the first flat surface of the functional element and the second flat surface of the functional element by draw down board method using a #3.5 Mayer rod. Discs of the functional element were die cut and thermoformed to a 4-base curvature prior to positioning within a semi-finished lens casting cell, as described above. One or more voids remained on either side of the functional element. The casting mold was then filled with, as a lens substrate precursor, a thermoset CR39® monomer containing about 3% isopropylperoxydicarbonate (IPP). The filled casting mold was cured to a desired hardness and the SF lens was surface to either of a −6.00 diopter or a −8.00 diopter.

Example 2

Primer 2 of Example 2 included REFERENCE BASE COMPOSITION #1 (90 wt. %) and allyl trimethoxysilane (10 wt. %). Primer 2 was applied to both surfaces of a flat functional element which was then thermoformed to a desired curvature in order to generate an ophthalmic lens having a concave lens substrate and a convex lens substrate adhered to the functional element. Accordingly, Primer 2 was first applied to a first flat surface of the functional element, and UV-cured to tack free, as in FIG. 6B. The functional element having the treated first flat surface was then primed on the second flat surface of the functional element and cured, as described above. The primer was applied to each of the first flat surface of the functional element and the second flat surface of the functional element by draw down board method using a #3.5 Mayer rod. Discs of the functional element were die cut and thermoformed to a 4-base curvature prior to positioning within a semi-finished lens casting cell, as described above. One or more voids remained on either side of the functional element. The casting mold was then filled with, as a lens substrate precursor, a thermoset CR39® monomer containing about 3% IPP. The filled casting mold was cured to a desired hardness and the SF lens was surface to either of a −6.00 diopter or a −8.00 diopter.

Example 3

Primer 3 of Example 3 included REFERENCE BASE COMPOSITION #1 (90 wt. %) and allyl triethoxysilane (10 wt. %). Primer 3 was applied to both surfaces of a flat functional element which was then thermoformed to a desired curvature in order to generate an ophthalmic lens having a concave lens substrate and a convex lens substrate adhered to the functional element. Accordingly, Primer 3 was first applied to a first flat surface of the functional element, and UV-cured to tack free, as in FIG. 6B. The functional element having the treated first flat surface was then primed on the second flat surface of the functional element and cured, as described above. The primer was applied to each of the first flat surface of the functional element and the second flat surface of the functional element by draw down board method using a #3.5 Mayer rod. Discs of the functional element were die cut and thermoformed to a 4-base curvature prior to positioning within a semi-finished lens casting cell, as described above. One or more voids remained on either side of the functional element. The casting mold was then filled with, as a lens substrate precursor, a thermoset CR39® monomer containing about 3% IPP. The filled casting mold was cured to a desired hardness and the SF lens was surface to either of a −6.00 diopter or a −8.00 diopter.

Example 4

Primer 4 of Example 4 included REFERENCE BASE COMPOSITION #1 (86 wt. %) and vinyl trimethoxysilane (14 wt. %). Primer 4 was applied to both surfaces of a flat functional element which was then thermoformed to a desired curvature in order to generate an ophthalmic lens having a concave lens substrate and a convex lens substrate adhered to the functional element. Accordingly, Primer 4 was first applied to a first flat surface of the functional element, and UV-cured to tack free, as in FIG. 6B. The functional element having the treated first flat surface was then primed on the second flat surface of the functional element and cured, as described above. The primer was applied to each of the first flat surface of the functional element and the second flat surface of the functional element by draw down board method using a #3.5 Mayer rod. Discs of the functional element were die cut and thermoformed to a 4-base curvature prior to positioning within a semi-finished lens casting cell, as described above. One or more voids remained on either side of the functional element. The casting mold was then filled with, as a lens substrate precursor, a thermoset CR39® monomer containing about 3% IPP. The filled casting mold was cured to a desired hardness and the SF lens was surface to either of a −6.00 diopter or a −8.00 diopter.

Following removal from the casting molds and surfacing, minimal to no haze and minimal demolding or delamination were observed in semi-finished lenses containing internally-positioned functional elements that were treated with any of Examples 1-4. Results of these lenses are shown in Table 4.

TABLE 4

| Example # | Lens 1 (−6.00) | Lens 2 (−6.00) | Lens 1 (−8.00) | Lens 2 (−8.00) |
|---|---|---|---|---|
| Example 1 | no delamination observed during surfacing | no delamination observed during surfacing | no delamination observed during surfacing | no delamination observed during surfacing |
| Example 2 | no delamination observed during surfacing | no delamination observed during surfacing | cracks or scratches in functional element | no delamination observed during surfacing |
| Example 3 | small delamination at deblock site | no delamination observed during surfacing | possible delamination and fracture of front surface near edge | no delamination observed during surfacing |
| Example 4 | no delamination observed during surfacing | no delamination observed during surfacing | no delamination observed during surfacing | no delamination observed during surfacing |

Obviously, numerous modifications and variations are possible in light of the above teachings. It is therefore to be understood that within the scope of the appended claims, the invention may be practiced otherwise than as specifically described herein.

Embodiments of the present disclosure may also be as set forth in the following parentheticals.

(1) An ophthalmic lens, comprising at least one polymerized lens substrate including at least one thermoset monomer, a functional component including at least one thermoplastic layer, a surface of the at least one thermoplastic layer facing the polymerized lens substrate, and a primer coating deposited onto the surface of the at least one thermoplastic film facing the polymerized lens substrate.

(2) The ophthalmic lens according to (1), wherein the functional component includes at least one dye selected from the group consisting of a photochromic dye, a dichroic dye, a blue cut dye, an infrared cut dye, an ultraviolet cut dye, a selective wavelength cut dye, a color enhancement dye, a polarizing dye, and a light filter dye.

(3) The ophthalmic lens according to either (1) or (2), wherein the functional component includes a functional layer including, as the at least one dye, the photochromic dye, and being one of a polyether block amide functional layer or a thermoplastic polyurethane functional layer.

(4) The ophthalmic lens according to either (1) or (2), wherein the functional component includes a functional layer including, as the at least one dye, the polarizing dye, and being a polyvinyl alcohol functional layer.

(5) The ophthalmic lens according to any one of (1), (2), and (4), wherein the at least one thermoplastic film of the functional component is two thermoplastic films and the polyvinyl alcohol functional layer is arranged therebetween, each of the two thermoplastic films being one selected from the group consisting of a polycarbonate film, a triacetyl cellulose film, and a polyamide film.

(6) The ophthalmic lens according to any one of (1) to (5), wherein the at least one polymerized lens substrate is adhered to a convex surface of the functional component.

(7) The ophthalmic lens according to any one of (1) to (6), wherein the at least one polymerized lens substrate is adhered to a concave surface of the functional component.

(8) The ophthalmic lens according to any one of (1) to (7), wherein the at least one thermoplastic film of the functional component is a polycarbonate film.

(9) The ophthalmic lens according to any one of (1) to (8), wherein the primer coating includes at least one first reactive monomer, at least one second reactive monomer, and at least one photoactive catalyst.

(10) The ophthalmic lens according to any one of (1) to (9), wherein the at least one photoactive catalyst is reactive to ultraviolet light.

(11) The ophthalmic lens according to any one of (1) to (10), wherein the at least one second reactive monomer of the primer coating is an alkoxysilane.

(12) The ophthalmic lens according to any one of (1) to (11), wherein the at least one second reactive monomer of the primer coating includes a reactive group selected from the group consisting of allyl, vinyl, acrylic, thiol, isocyanate, epoxy, and amine.

(13) The ophthalmic lens according to any one of (1) to (12), wherein the reactive group is an epoxy.

(14) The ophthalmic lens according to any one of (1) to (13), wherein the at least one photoactive catalyst includes a cationic photoinitiator and a free radical photoinitiator.

(15) The ophthalmic lens according to any one of (1) to (14), wherein the at least one first reactive monomer of the primer coating is an acrylic monomer or a mixture of acrylic monomers.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. An ophthalmic lens, comprising:
   at least one polymerized lens substrate including at least one thermoset monomer;
   a functional component including at least one thermoplastic layer, a surface of the at least one thermoplastic layer facing the polymerized lens substrate; and
   a primer coating deposited onto the surface of the at least one thermoplastic layer facing the polymerized lens substrate;
   wherein the primer coating includes
      at least one first reactive monomer including a reactive acrylic group,
      at least one second reactive monomer, and
      at least one photoactive catalyst;
   wherein the at least one first reactive monomer of the primer coating is an acrylic monomer or a mixture of acrylic monomers;
   wherein the at least one first reactive monomer of the primer coating is capable of reacting with the lens substrate monomer; and
   wherein the at least one second reactive monomer of the primer coating is an alkoxysilane.

2. The ophthalmic lens according to claim 1, wherein the functional component includes at least one dye selected from the group consisting of a photochromic dye, a dichroic dye, a blue cut dye, an infrared cut dye, an ultraviolet cut dye, a selective wavelength cut dye, a color enhancement dye, a polarizing dye, and a light filter dye.

3. The ophthalmic lens according to claim 2, wherein the functional component includes a functional layer having, as the at least one dye, the photochromic dye, and being one of a polyether block amide functional layer or a thermoplastic polyurethane functional layer.

4. The ophthalmic lens according to claim 2, wherein the functional component includes a functional layer having, as the at least one dye, the polarizing dye, and being a polyvinyl alcohol functional layer.

5. The ophthalmic lens according to claim 4, wherein
   the at least one thermoplastic layer of the functional component is two thermoplastic films and the polyvinyl alcohol functional layer is arranged therebetween,
   each of the two thermoplastic films being selected from the group consisting of a polycarbonate film, a triacetyl cellulose film, and a polyamide film.

6. The ophthalmic lens according to claim 1, wherein the at least one polymerized lens substrate is adhered to a convex surface of the functional component.

7. The ophthalmic lens according to claim 1, wherein the at least one polymerized lens substrate is adhered to a concave surface of the functional component.

8. The ophthalmic lens according to claim 1, wherein the at least one thermoplastic layer of the functional component is a polycarbonate film.

9. The ophthalmic lens according to claim 1, wherein the at least one photoactive catalyst is reactive to ultraviolet light.

10. The ophthalmic lens according to claim 1, wherein the at least one second reactive monomer of the primer coating includes a reactive group selected from the group consisting of allyl, vinyl, acrylic, thiol, isocyanate, epoxy, and amine.

11. The ophthalmic lens according to claim 10, wherein the reactive group is an epoxy.

12. The ophthalmic lens according to claim 1, wherein the at least one photoactive catalyst includes a cationic photoinitiator and a free radical photoinitiator.

13. The ophthalmic lens according to claim 1, wherein the alkoxysilane is one selected from the group consisting of allyltrimethoxysilane, allyltriethoxysilane, and vinyltrimethoxysilane.

14. The ophthalmic lens according to claim 1, wherein the alkoxysilane is one selected from the group consisting of allyltrimethoxysilane, and allyltriethoxysilane.

* * * * *